Figure 1:
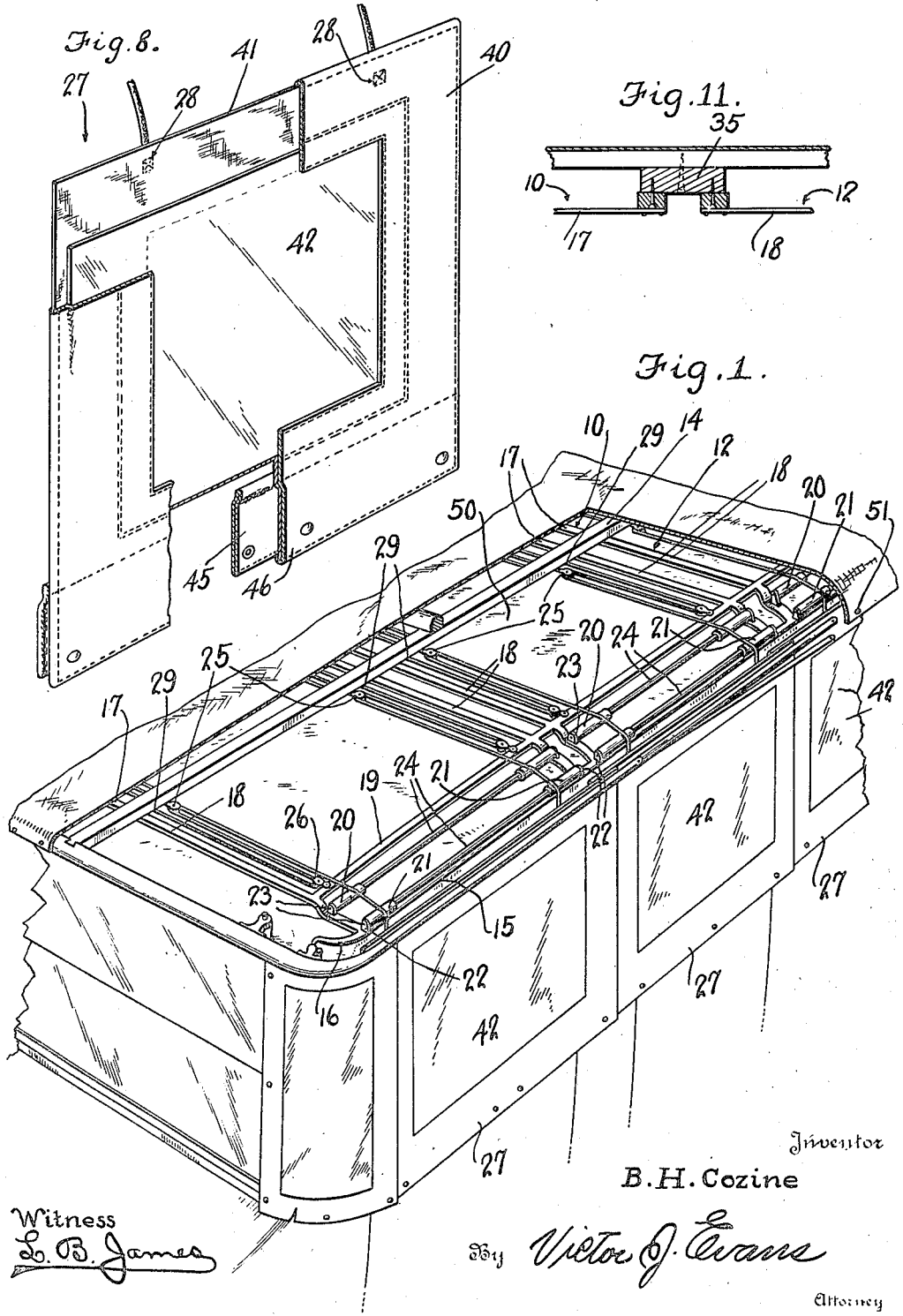

July 22, 1924.

B. H. COZINE

AUTOMOBILE CURTAIN AND TOP

Filed Dec. 19, 1919  3 Sheets-Sheet 2

1,502,423

Inventor
B. H. Cozine

Witness
L. B. James

By Victor J. Evans
Attorney

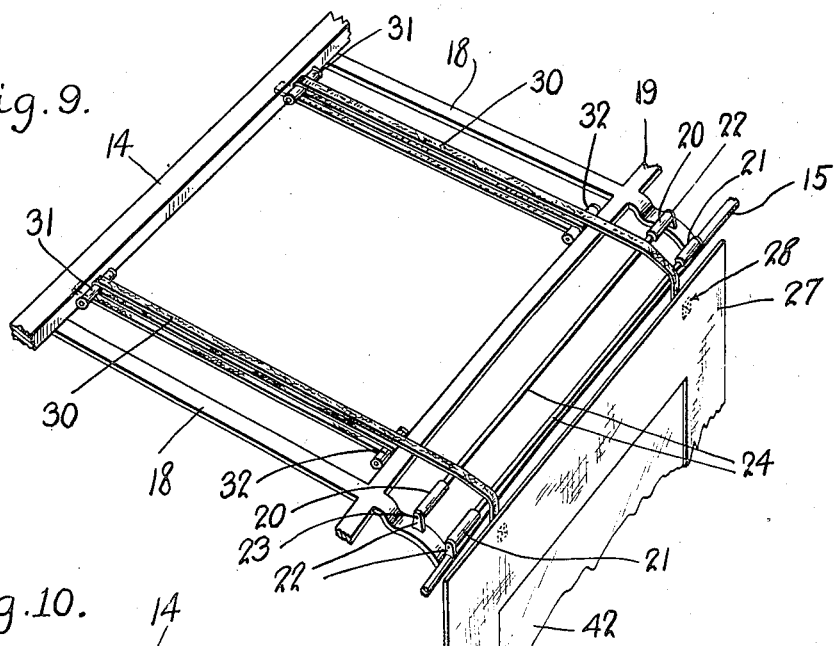

Patented July 22, 1924.

1,502,423

UNITED STATES PATENT OFFICE.

BENJAMIN H. COZINE, OF LOUISVILLE, KENTUCKY.

AUTOMOBILE CURTAIN AND TOP.

Application filed December 19, 1919. Serial No. 345,923.

*To all whom it may concern:*

Be it known that I, BENJAMIN H. COZINE, citizen of the United States, residing at Louisville, in the county of Jefferson and State of Kentucky, have invented new and useful Improvements in Automobile Curtains and Tops, of which the following is a specification.

This invention relates to automobile curtains and tops, and one object is to provide a structure which may be manufactured as an independent unit, adapted to be secured within the top of an automobile or other vehicle, with particular means for mounting or hanging a plurality of curtains within the structure so formed, in order that, when in operative position, the curtains may provide a substantially continuous semi-rigid inclosing member on each side of the car body.

A further object is to provide means whereby each curtain may be automatically returned to normal position when released, independent of guiding means of the usual type.

A still further object is to provide a plurality of curtains mounted or hung by means of resilient elements operating in connection with swivelled devices, whereby the use of other guiding devices is dispensed with.

A still further object is to provide a structure to be secured beneath the top of an automobile, with means whereby it may readily be detached, and means permitting the structure to conform, in width, the width of the top.

A still further object is to provide a structure of the type indicated which shall permit the mounting of the curtains in overlapping relation, with means for entirely concealing the structure and curtains when in inoperative position.

A still further object is to provide a curtain especially adapted for the purpose described, and including a waterproof reinforcing element extending laterally from the edges of the window opening, and further to provide rollers of novel construction, for relieving pressure on the transparent element of the curtain.

With the foregoing and other objects in view, the invention consists in the novel construction, combination, and arrangement of elements hereinafter described and claimed.

Figure 2:
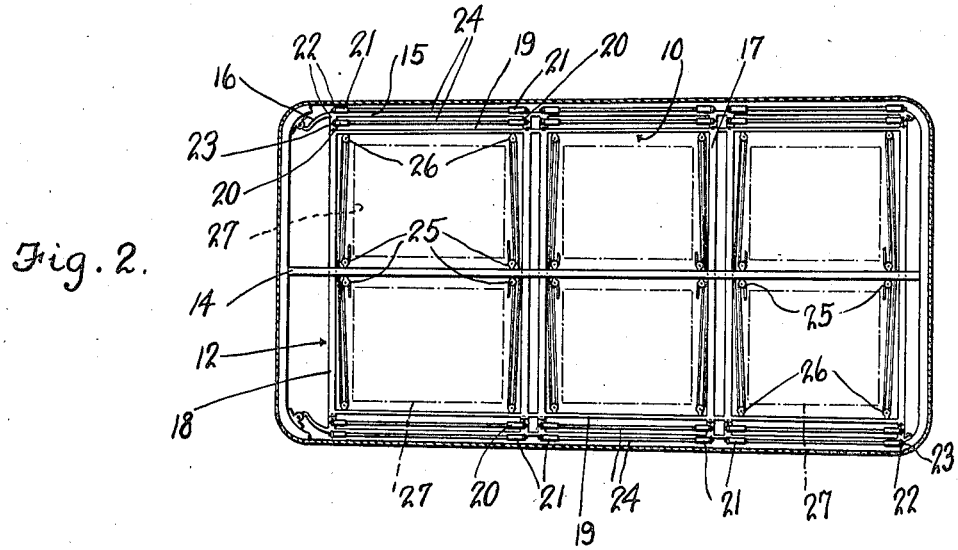
Figure 3:
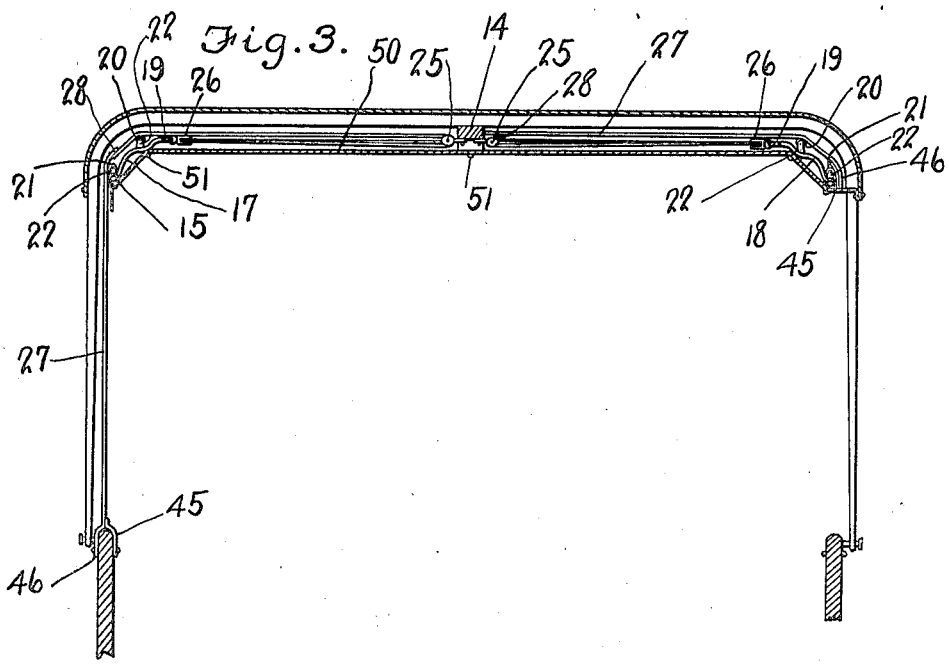

In the drawings,

Figure 1 is a perspective view of the supporting structure, in operative position, the curtains being drawn, Figure 2 is a transverse section through the permanent top of the machine, the attachment being in position, Figure 3 is a vertical transverse section, Figure 4 is a similar section, the central longitudinal element being shown as one of the permanent members of the top, Figure 5 is a detail view showing a curved element for connection with one of the longitudinal members of the frame, Figure 6 is a detail view of a pulley, with a swivelled eye member connected therewith, Figure 7 is a detail of the structure at the central portion of Figure 4, Figure 8 is a perspective view showing the construction of one of the curtains, parts being broken away, Figures 9 and 10 are perspective views showing the mounting of the curtains, when employing bands,

Figure 11 is a detail in vertical section showing means whereby two longitudinal frame members constituting frame sections may be connected with the central longitudinal bar and spaced apart at the distance required for forming a complete frame of a width corresponding to the width of the top.

In my copending application, filed February 1, 1919, Serial Number 274,391, I have shown and described certain means for mounting the curtains of a motor vehicle, in a detachable structure to be supported beneath the top. In the present application, I have shown a detachable structure for a similar purpose, with certain improved means for mounting and controlling the curtains.

The structure beneath the top may include a plurality of longitudinally extending frames or sections, designated 10 and 12, these frame each including an inner bar 14, located near the central portion of the top, and an outer rod or bar 15, the elements 14 and 15 extending preferably the full length of the vehicle top. The rods 15 are provided at their front ends with curved or deflected extensions 16, which conform more or less to the curvature of the end portions of the extreme front bow of the permanent vehicle top so as to allow the small curtains usually employed at the ends of the windshield to overlap the forward edges of the forward side curtains as shown in Figure 1. The extensions also serve as means for detachably supporting the forward ends of the frame sections 10 and 12. For this purpose the extreme forward ends of the extensions are made of relatively small diameter (5) and engage in sockets carried by the forward bow of the permanent top (Figures 1 and 2) and may be detachably retained in place in the sockets by set screws or equivalent means (Figure 1). The rear ends of the extensions 16 are reduced (Fig. 5) and fit into the forward ends of the rods 15.

The inner bar 14 may be common to the two frame sections (Fig. 4) or each frame may be provided with an inner bar for purposes of allowing lateral adjustment of the frame sections, as will be set forth with reference to Figure 11.

Transverse bars 17 and 18 are located as shown and are connected with the inner bar or bars 14, as the case may be, and with the outer rods 15, and each frame section is provided with a longitudinal bar or rod 19 which connects the transverse bars of the section in spaced relation to the outer rod 15 of the section and serves as a means for strengthening the section and also as a means for attaching the outer sets of pulleys 26, around which pass the flexible elements which operate the curtains as will hereinafter more fully appear. These flexible elements may take the form of elastic strips or elastic cords, the latter being shown in Figure 1 and the former in Figure 9.

Longitudinally extending rollers, providing bearing surfaces for the curtains, are designated 20 and 21, these rollers being of special construction. Any suitable number of rollers may be provided, the mounting elements therefor being shown at 22, and the end bearing members of the rollers at 23. The rollers are cut away, or are of reduced diameter, at the central portion, the length of the cut away portion depending upon the dimensions of the window provided in the curtain proper. The portion of reduced diameter is designated 24.

As shown in certain figures in the drawings, each frame section is provided with two sets of rollers, arranged in spaced and substantially parallel relation to each other, the rollers 21 forming the outer set and the rollers 20 forming the inner set. The outer set of rollers is so disposed with respect to the outer bar 15 that the curtains will be prevented from scraping the bar as they pass over the rollers, while the inner set of rollers are similarly disposed with relation to the bar 19 so that the rollers thus serve as means for supporting the curtains out of injurious contact with the frame section as the curtains are extended and retracted relatively to the frame sections.

In that form in which elastic cords and pulleys are employed, an inner set of pulleys 25 are connected with the bar 14, and an outer set of pulleys 26 are connected with bar 19, the elastic cords being connected with the curtains 27 at the points 28, passing thence around pulleys 25, then returning and passing around pulleys 26, whence they extend to bar 14, being connected at points 29.

The foregoing arrangement of cords and pulleys is regarded as of exceptional importance, since it permits of a maximum degree of flexibility and elasticity, and makes it possible to do away with other guiding devices, such as would otherwise be necessary, in order to prevent interference with smooth and regular operation, when the curtains are pulled unevenly, or toward one side. When the curtains have been pulled part way down, there are three lengths of the elastic cords or strips, as the case may be, which may be said to be active, so that the strain is evenly distributed and the durability of the elastic elements is thereby increased. Deflection of the curtains due to air pressure is automatically taken care of or compensated for, and the curtains immediately return to normal position.

In the form shown in Figure 9 the elastic strips 30 serve a similar purpose, these strips passing over rollers 31 and 32, located respectively on bars 14 and 19.

The structure beneath the top constitutes in fact a single unit when the sections 10 and 12 are connected, and if desired may be formed as such. By providing a connecting bar 35 (Figure 11) and by providing the sections with separate inner longitudinal bars as shown, the sections 10 and 12 may be spaced apart a suitable distance to permit the structure to fit a given top, and when the desired distance between the sections has been attained the longitudinal bars of the frame sections may be secured to the connecting bar 35 as shown. It will be understood that the device is to be constructed for use in all standard tops already in service, as well as for new tops, or for vehicles or vehicle bodies in course of manufacture. The elements 15 are curved to conform to the curvature of the edges of the top, when those edges are curved as is quite common and the curved extensions 16 at the front permit the curtains herein described to assume the relationship shown in Figure 1 to the usual curtains employed at the front of the car.

As shown in Figure 2, the rear outer corners of the frame sections are detachably secured by screws or other suitable means to the rear bow of the permanent top of the vehicle.

The curtains each include an outer layer 40 of suitable material and an inner layer 41, the window opening being covered by a sheet of celluloid designated 42, which not only covers the opening but extends laterally from the edges of the opening, between the elements 40 and 41, and acts as a stiffening member, providing partial rigidity. No other material will satisfactorily take the place of this sheet which not only affords the necessary facilities for observation, while excluding the air and permitting the curtain to flex as it is extended and retracted, but also provides a waterproof reinforcing element which maintains its original condition regardless of circumstances, and throughout the life of the material. When the curtains are retracted they lie in a substantially flat and compact position beneath the permanent vehicle top. The peculiar formation of the rolls 24 prevents injury to the celluloid.

Each curtain is provided at the bottom with a strip 45, preferably extending the full width of the curtain, and adapted to be secured to the inner portion of the side of the car body, while the portion 46 of the curtain may be secured to the outside, as shown. This permits of ready attachment before or after entering the vehicle.

After the structure is placed beneath the top, and detachably secured, the lining 50 is placed in position so that the frame and curtains are concealed, the lining being proportioned as shown. The securing devices for the lining, on the inner side thereof, are designated 51.

Certain of these securing devices 51 are near the outer edge of the lining and permit the edge portions to be retained in such manner as to entirely inclose the curtains and prevent the edges of the latter from protruding. The device is thus serviceable in a maximum degree when in use, and the top presents a good appearance when the curtains are rolled.

The main frame is attached near the ends thereof, leaving a free intervening space for the curtains, which permits the latter to overlap one another for the purpose of forming a substantially continuous side. The freedom of movement allowed wholly eliminates any binding action which frequently results from the use of curtains operating in guides. The resilient elements operating over swivelled pulleys make it unnecessary to use any particular care in shifting the curtains, at the same time insuring the return of the curtains to proper position. The relative position of the movable and stationary elements contributes to this result, and the waterproof stiffening of the individual curtains has an important function in producing a semi-rigid side member or continuous curtain for the vehicle.

What I claim is—

1. The combination with a vehicle top, of a detachable frame structure to fit beneath the top when the latter is extended, curtains movable transversely of the structure, said curtains being provided with an opening, flexible transparent elements covering the openings and incorporated in the curtains, and a roller for each curtain and carried by the detachable frame structure and extending across the curtain and over which the curtain may move, said roller having enlarged end portions bearing across the portions of the curtain at the sides of the opening therein, and to the exclusion of the portion of the transparent element covering such opening.

2. In a device of the class described, a curtain including a flexible transparent element, and a roller substantially co-extensive in length with the width of the curtain and over which the curtain is movable, said roller having end portions of enlarged diameter for bearing against the side portions of the curtain beyond the flexible transparent element thereby relieving pressure on the flexible transparent element.

3. The combination with a vehicle top, of a separate frame detachably connected to the top and being entirely supported thereby, the lateral edges of the frame being spaced from the lateral edges of the vehicle top so that a clear unobstructed space extending from end to end of the frame between the longitudinal edges of the frame and the longitudinal edges of the vehicle top, is provided, a series of curtains on each side of the medial line of the frame, and arranged in overlapping relation on the frame, spaced sets of guide members carried by the frame on each side of the medial line thereof, elastic elements connected with each curtain, and extending, in a plurality of lengths between and over opposite guide members of the said spaced sets, and at their inner ends being attached to the frame.

4. The combination with a unitary detachable frame adapted to be mounted in a vehicle top, and when so mounted to leave a continuous unobstructed space between the longitudinal edges of the frame and the top, of a set of curtains arranged on each side of the medial line of the frame, the curtains of each set being disposed in substantially flat condition on the frame with their transverse edges arranged in overlapping relation, spaced sets of guiding means carried by the frame on each side of the medial line thereof, flexible elastic operating elements for the curtains connected at their outer ends to the curtains and then passing over and extending between opposite guiding means of the said sets and at their inner ends being attached to the frame, and a plurality of series of rollers carried by the frame adjacent its lateral edges and over which the curtains and operating elements may operate.

5. The combination with a frame constituting a unitary detachable structure adapted to be mounted in a vehicle top, of a set of curtains arranged on each side of the medial line of the frame in a substantially flat condition with the transverse edges of the curtains of each set overlapping, guiding means carried by the frame on each side of its medial line, flexible elastic operating elements for the curtains connected at their outer ends to the curtains and passing over the guiding means, and being connected at their inner ends to the frame, and anti-friction devices carried by the frame adjacent its lateral edges over which the curtains and operating elements may operate.

6. The combination with a vehicle top, of a unitary frame and curtain structure removably mounted in the vehicle top and including a frame substantially co-extensive with the vehicle top, a series of curtains disposed upon the frame in substantially flat condition, with their transverse edges in over-lapping relation, elastic elements connecting the curtains with the frame, the curtains being otherwise free and unrestrained, and guiding means carried by the frame over which the elastic elements operate, the sides of the frame being spaced from the longitudinal sides of the vehicle top to provide a free uninterrupted space through which the curtains may be drawn.

In testimony whereof I affix my signature.

BENJAMIN H. COZINE.